United States Patent [19]

Orelup

[11] 4,000,985
[45] Jan. 4, 1977

[54] AZO DYES HAVING A HIGH SOLUBILITY IN PETROLEUM FUELS

[75] Inventor: Richard B. Orelup, Upper Saddle River, N.J.

[73] Assignee: Morton-Norwich Products, Inc., Chicago, Ill.

[22] Filed: Oct. 24, 1975

[21] Appl. No.: 625,679

Related U.S. Application Data

[63] Continuation-in-part of Ser. No. 601,015, Aug. 1, 1975, abandoned.

[52] U.S. Cl. .................................. 44/59; 260/191; 260/205
[51] Int. Cl.² .................. C10L 1/22; C07C 107/04
[58] Field of Search .......... 260/191, 184, 177, 174; 44/59, 64

[56] References Cited

UNITED STATES PATENTS

3,096,140  7/1963  Gaetani .......................... 260/191 X

*Primary Examiner*—Charles F. Warren
*Attorney, Agent, or Firm*—Jack Axelrood

[57] ABSTRACT

Azo dyes which are highly soluble in petroleum fuels. The dyes have the general formula

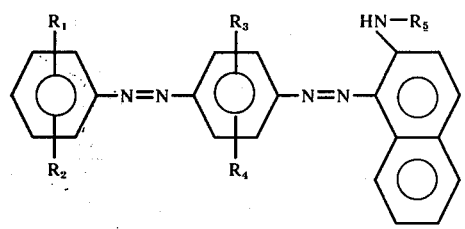

where $R_1$, $R_2$, $R_3$, and $R_4$ are each H or $CH_3$ and $R_5$ is either 2-ethylhexyl or 2-ethylhexyloxypropyl. When $R_5$ is 2-ethylhexyl, then at least one of $R_1$, $R_2$, $R_3$ and $R_4$ is $CH_3$. When $R_5$ is 2-ethylhexyloxypropyl, then each of $R_1$, $R_2$, $R_3$ and $R_4$ is H, or at least one of $R_1$, $R_2$, $R_3$ and $R_4$ is $CH_3$ provided that $R_1$ and $R_3$ are not both $CH_3$ at the same time that $R_2$ and $R_4$ are each H, and provided that $R_2$ and $R_4$ are not both $CH_3$ at the same time that $R_1$ and $R_3$ are both H.

21 Claims, No Drawings

AZO DYES HAVING A HIGH SOLUBILITY IN PETROLEUM FUELS

This application is a continuation-in-part of Ser. No. 601,015, filed Aug. 1, 1975, now abandoned.

BACKGROUND OF THE INVENTION

1. Field of the Invention

The present invention is directed to the coloration of petroleum fuels. There is a need for dyes which are quickly and highly soluble in petroleum fuels such as, for example, gasoline, diesel oils and heating and fuels oils. As is pointed out in U.S. Pat. No. 3,764,273, this need arises because of the laws of certain foreign countries which impose taxes on motive and heating oils. These laws provide that particular dyes and/or marking agents must be added to these oils to provide a means for identification to prove or disprove the payment of taxes. For example, Manitoba Regulation 51/66 under the Motive Fuel Tax Act of Canada, provides in part that "Motive fuel used for any of the purposes mentioned in subsection (7) of Section 3 of the Act shall be given a specific colour and separate identity by means of a purple dye and a chemical marker, as may be determined by the minister."

A law passed in the Federal Republic of West Germany requires the addition of certain chemicals to distillate type heating oils sold in that country after Apr. 1, 1976. These chemicals are intended to permit the identification of taxed heating oils if used illegally for much more highly taxed diesel fuels. The opportunity for fraud exists because the chemical and physical properties of heating oils and of diesel oils are quite similar.

2. Description of the Prior Art

A great variety of azo dyes have been used for many years to color gasoline and other petroleum fuels and/or distillates. These dyes have usually been solid dyes in the form of powders, flakes, granules and the like which tend to cake and which have a limited solubility and a low rate of dissolution. For instance, the solubility of the various azo dyes used in the past has been of the order of magnitude of less than about 2%, ranging upward to about 5% in some instances. Further, and most importantly, the rate of dissolution of these solid dyes in gasolines, diesel and heating oils is very slow and requires special techniques. One such special technique is the so-called "dry dye eductor" system described in U.S. Pat. No. 2,925,333. In this same patent (at Column 6) it is disclosed that the solubility test was conducted by mixing gasoline with dye "on a slowly rotating wheel for 16 hours at 80° F."

In addition, the use of powdered dyes causes (1) the evolution of noxious dye dust which exposes personnel to inhalation hazards requiring the adoption of precautionary measures and respiratory devices and (2) the deposition of dye dust on equipment and throughout the plant area requiring frequent cleanup.

Several solutions to these various problems have been suggested by the prior art. Thus, U.S. Pat. No. 3,049.533 attempts to overcome the caking and dusting problems by providing azo dyes in the form of thin platelets formed on a rotating drum.

Another solution to the problems associated with solid dyes is that of British Pat. No. 1,108,981 which solubilizes difficulty soluble solid dyes in a mixture of a liquid phenol and a hydrocarbon to provide a liquid dye. U.S. Pat. No. 3,690,809 also provides a liquid azo dyestuff by a particular combination of a mixture of azo dyes containing defined alkyl phenols or alkyl naphthols in the dye molecule together with a liquid organic viscosity depressant. Some well-known so-called "oil soluble" solid azo dyes used for coloring petroleum fuels include the following (where "C.I." refers to color index):

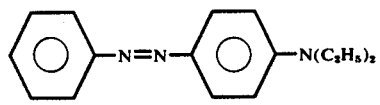

SOLVENT YELLOW NO. 56    C.I. 11021

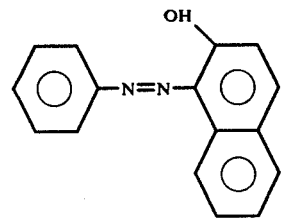

SOLVENT YELLOW NO. 14    C.I. 12055

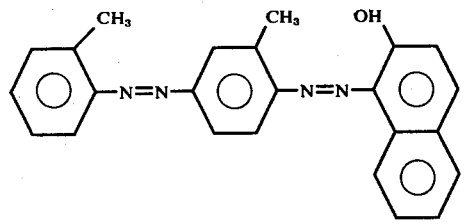

SOLVENT RED NO. 24    C.I. 26105

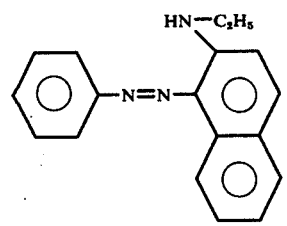

SOLVENT RED NO. 19    C.I. 26050

Each of the foregoing dyes presents the same disadvantages previously noted for solid dyes in general. The solubility deficiencies of Solvent Red No. 19 (C.I. 26050) will be demonstrated more fully in the Examples hereinafter set forth.

As is readily apparent, an azo dye which has excellent solubility in petroleum fuels and exhibits good storage would be desirable to remedy the defects of solid azo dyes.

Accordingly, it is an object of this invention to provide azo dyes which have high solubility in petroleum fuels and a practically instantaneous rate of dissolution therein.

It is another object of this invention to provide azo dyes which have a high rate of solubility in petroleum fuels, a practically instantaneous rate of dissolution therein, exhibit storage stability and do not adversely affect the physical and chemical characteristics of the petroleum distillate to which the are added.

SUMMARY OF THE INVENTION

The present invention provides an azo dye composition having the general formula

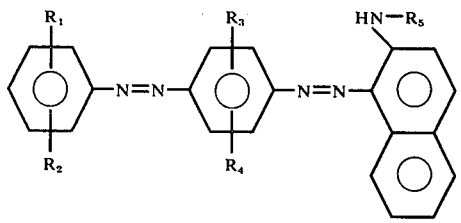

wherein:

A. When $R_5$ is 2-ethylhexyl, then at least one of said $R_1$, $R_2$, $R_3$ and $R_4$ is $CH_3$;

B. when $R_5$ is 2-ethylhexyloxypropyl, then each of said $R_1$, $R_2$, $R_3$ and $R_4$ is either H, or $CH_3$ provided that $R_1$ and $R_3$ are not both $CH_3$ at the same time when $R_2$ and $R_4$ are both H, or $R_2$ and $R_4$ are not both $CH_3$ at the same time when $R_1$ and $R_3$ are both H.

This invention also provides a colored petroleum fuel having dissolved therein a dye composition of said general formula.

The term "petroleum fuel", as used herein, means such petroleum-derived distillate products as gasoline, diesel oils, heating or fuel oils, kerosenes, jet fuels and naphthas.

The azo dyes of this invention overcome the disadvantages noted for solid dyes and possess several unique properties making them especially useful in coloring petroleum fuels. These properties are summarized as follows:

1. They are non-solids at room temperature, i.e., ranging from viscous tars to fairly mobile fluids.

2. They are highly soluble in petroleum fuels. The term "highly soluble", as used herein, means a solubility in petroleum fuels of at least about 25 percent by weight at ambient temperatures of 20° or 25° C.

3. They display a practically instantaneous rate of dissolution in petroleum fuels.

4. They display the properties of high solubility in petroleum fuels and fast rate of solubility therein under both high and low temperature conditions of storage for long periods of time.

5. They do not affect the physical or chemical properties of the petroleum fuel to which they are added.

In the instance where $R_5$ is 2-ethylhexyl, these azo dyes may be prepared by conventional diazotization of aminoazotoluene, or of aniline coupled to o-toluidine, or of mixed toluidines and xylidines, after which the diazotized product is coupled to 2-ethylhexylamino naphthalene. In the instance where $R_5$ is 2-ethylhexyloxypropyl, then aminoazobenzene is diazotized and coupled to 2-ethylhexyloxypropylamino naphthalene. Alternatively, a suitable non-solid, i.e., liquid or tarry, azo dye may be prepared in the instance where $R_5$ is 2-ethylhexyloxypropyl by the conventional diazotization of aniline coupled to o-toluidine or of mixed toluidines and xylidines followed by coupling to 2-ethylhexyloxypropylamino naphthalene. Surprisingly, it was found that diazotized aminoazotoluene coupled to 2-ethylhexyloxypropylamino naphthalene produced a solid dye having relatively low solubility in petroleum fuels.

One of the preferred azo dyes of this invention is where $R_5$ is 2-ethylhexyl and where one to two members of $R_1$, $R_2$, $R_3$ or $R_4$ is $CH_3$.

The compound 2-ethylhexylamino naphthalene may be prepared by the so-called Bucherer reaction as follows:

Beta-naphthol, 2-ethylhexylamine and sodium bisulfite are slurried in water and reacted in an autoclave at a temperature of 175° C. for about 12 hours. The mass is cooled, and the oil layer is separated therefrom. The oil layer is washed successively with dilute aqueous acetic acid and with hot dilute aqueous caustic soda to remove unreacted 2-ethylhexylamine and beta-napthol respectively, then dried.

In similar manner, 2-ethylhexyloxypropylamino naphthalene may be prepared by substituting 2-ethylhexyloxypropylamine for 2-ethylhexylamine.

The azo dyes of this invention may be prepared as substantially 100 % active colorants, or they may be dissolved in suitable solvents to provide color concentrates in which the active dye ranges from about 50% to about 75% by weight. Suitable solvents include but are not limited to ketones, esters, chlorinated solvents, aliphatics, aromatics such as toluene and xylene, and any of said petroleum fuels.

One of the principal distinctions between the present azo dyes and the widely used solid dye Solvent Red No. 19 is the unexpectedly high solubility in petroleum fuels of the former relative to the latter.

This is demonstrated by a series of solubility and stability tests described in the Examples hereinafter set forth using the following pairs of diesel and heating oils as exemplary of petroleum fuels:

No. 1 Heating Oil and No. 1 Diesel Oil
No. 2 Heating Oil and No. 2 Diesel Oil
No. 4 Heating Oil and No. 4 Diesel Oil The nature of and very close to relationship between corresponding pairs of heating oils and diesel oils are indicated by their physical properties which are set forth in the following Tables 1, 2 and 3.

Looking more closely at these oils, we find that No. 1 Heating Oil is a light distillate intended for use in vaporizing type oil burners, in which oil is vaporized by contact with a heated surface or by radiation.

No. 1 Diesel Oil is a volatile distillate fuel oil for engines in service requiring frequent speed and load changes.

The specifications of these oils are set forth in Table 1.

TABLE 1

| | No. 1 Heating Oil | No. 1 Diesel Oil |
|---|---|---|
| Flash Point (Pensky-Martens) Minimum ° F. | 100 | 100 |
| Pour Point ° F. Max. | 0 | — |
| Vol. % Water & Sediment | Trace | Trace |
| Carbon Residue % Max. | 0.15 | 0.15 |
| Ash Wt. % | — | 0.01 |
| Distillation Temp. ° F. | | |
| 10% Point Max. | 420 | — |
| 90% Point Max. | 550 | 550 |
| Kinematic Viscosity cst* 100° F. | | |
| Min. | 1.4 | 1.4 |
| Max. | 2.2 | 2.5 |
| Cetane Number Min. | — | 40 |
| Gravity API Min. | 35 | — |
| Copper Strip Corrosion Max. | No. 2 | No. 3 |
| Sulfur % Max. | 0.5 or legal | 0.50 |

*Centistokes

No. 2 Heating Oil is a heavier distillate than the No. 1 grade. It is intended for use in atomizing type burners which are used in most domestic and many medium capacity commercial-industrial burners.

No. 2 Diesel Oil is a distillate of lower volatility than No. 1, for engines in industrial and heavy mobile service, involving relatively high loads and uniform speeds. It forms by far the highest consumption of diesel engine oil, particularly for road vehicles. The similarity to No. 2 Heating Oil possibly creates the greatest incentive to tax frauds.

The specifications for these oils is set forth in Table 2.

TABLE 2

|  | No. 2 Heating Oil | No. 2 Diesel Oil |
|---|---|---|
| Flash Point (Pensky-Martens) Minimum ° F. | 100 | 125 |
| Pour Point ° F. Max. | 20 | — |
| Water & Sediment Vol. % | 0.05 | 0.05 |
| Carbon Residue | 0.35 | 0.35 |
| Ash Wt. % | — | 0.01 |
| Distillation Temp. ° F. |  |  |
| 10% Point Max. | — | — |
| 90% Point Max. | 640 | 640 |
| Kinematic Viscosity cst 100° F. |  |  |
| Min. | 2.0 | 2.0 |
| Max. | 3.6 | 4.3 |
| Cetane Number | — | 40 |
| Gravity API Min. | 30 | — |
| Copper Strip Corrosion | — | No. 3 |
| Sulfur % Max. | 0.5 or legal | 0.5 |

No. 4 Heating Oil is light residual or heavy distillate oil for use in burners which can atomize fuels of higher viscosity than domestic burners.

No. 4 Diesel Oil is a higher viscosity distillate or blend with residual oil used for constant low and medium speed engines with constant loads.

The specifications of these oils are set forth in Table 3.

TABLE 3

|  |  | No. 4 Heating Oil | No. 4 Diesel Oil |
|---|---|---|---|
| Flash Point (Pensky-Martens) Minimum ° F. |  | 130 | 130 |
| Pour Point ° F. |  | 20 | — |
| Water & Sediment Volume % |  | 0.50 | 0.50 |
| Carbon Residue on 10% Bottoms |  | — | — |
| Ash Wt. % Max. |  | 0.10 | 0.10 |
| Distillation Temp. : | 10% Point Max. | — | — |
|  | 90% Point Max. | — | — |
| Kinematic Viscosity cst 100° F. |  |  |  |
| Min. |  | 5.8 | 5.8 |
| Max. |  | 26.4 | 26.4 |
| Cetane Number |  | — | 30 |
| Gravity API |  | — | — |
| Copper Strip Corrosion |  | — | — |
| Sulfur % Max. |  | Legal | 2.0 |

For a more complete understanding of the present invention, reference is now made to the following specific examples illustrating the novel azo dyes of this invention, their preparation and solubility characteristics.

DESCRIPTION OF THE PREFERRED EMBODIMENTS

EXAMPLES 1–6 COUPLING COMPONENT 2-(2-ETHYLHEXYLAMINO) NAPHTHALENE

EXAMPLE 1

In a suitable vessel, 225 grams of finely ground o-aminoazotoluene are slurried in 2000 ml water containing 1 gram non-ionic surfactant until well wetted. 2.50 grams mols HCl are added and the resultant suspension is diazotized at 15° C. with 70 grams sodium nitrite and ice as required to maintain temperature. If the sodium nitrite is not completely consumed, a little more aminoazo compound is added until reaction is complete. The finished diazo solution is filtered, the mineral acidity is removed with 210 grams 60% sodium acetate, and ice is added to give a temperature of 5° C. A solution of 280.5 grams of coupling component 2-(2-ethylhexylamino) naphthalene (100%) in 560 grams methyl alcohol is run into the diazo solution slowly with stirring. Finely dispersed bluish red dye is formed. Stirring is continued until spot tests indicate coupling is complete at which time the finished dye has condensed into a crude oily, viscous liquid to yield the product having the following formula:

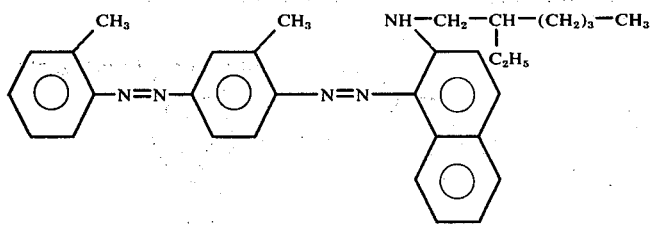

(LIQUID DYE)

PROCEDURE A

LIQUID DYE SOLUTION

The resultant oily viscous liquid dye may be heated and taken up in an appropriate oily solvent to provide a liquid dye composition comprising 50–70% active colorant and 50–30% solvent, depending on the quantity of solvent added.

PROCEDURE B

LIQUID DYE - ISOLATE

Alternatively, the crude liquid dye may be taken up with a volatile solvent and the solvent removed during the drying process to yield a non-volatile liquid colorant. This may be further purified by washing with hot alcohol, decanting and drying to isolate an approximately 100% active liquid dye.

EXAMPLE 2

In a suitable vessel, 233.5 grams (dry basis) of p-aminoazobenzene hydrochloride as approximately 800 grams wet paste are slurried in 1 liter water with 1.5 gram mols HCl. Ice is added as required with 70 grams nitrite, in portions, for diazotization at 10–12° C. When complete, as indicated by total takeup of nitrous acid, the diazo solution is filtered. 280.5 grams of the coupling agaent of Example 1, 2-(2-ethylhexylamino)- naphthalene (100%), are dissolved in 560 grams glacial acetic acid and are added to the diazo product after first cooling to 5° C. and removing mineral acidity with 210 grams 60% sodium acetate. The resultant dye crystallizes from oily solvents, including aromatic solvents, and diesel and heating oils. It is isolated as a crystalline solid dye at room temperature according to Procedure B of Example 1.

The product is

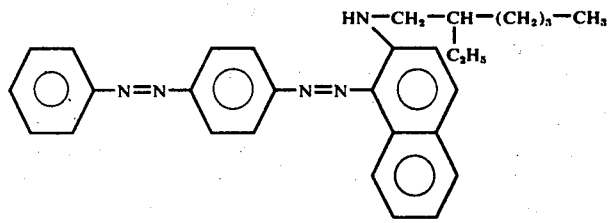

(SOLID DYE)

EXAMPLE 3

A slurry is made of 247.5 grams (dry basis) of the hydrochloride of the aminoazo compound resulting from the coupling of aniline to o-toluidine in 1 liter water containing 1.5 mols HCl. This mixture is diazotized with 70 grams of sodium nitrite at 0–5° C. The finished diazo product is filtered and coupled with 2-(2-ethylhexylamino) naphthalene according to the procedure of Example 1. A liquid dye is isolated by Procedure B of Example 1 and has the formula

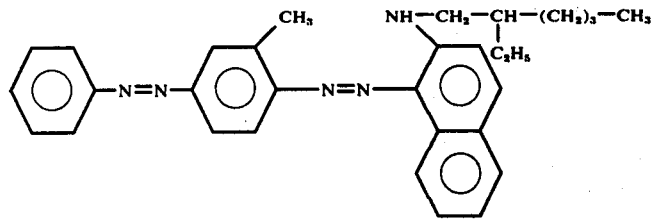

EXAMPLE 4

The procedure of Example 1 is followed, except that o-toluidine is coupled to 2,5 -xylidine and the resulting aminoazo compound is diazotized. The diazo product is coupled to 2-(2-ethylhexylamino)naphthalene and the resultant liquid dye having the following formula is isolated according to Procedure B of Example 1:

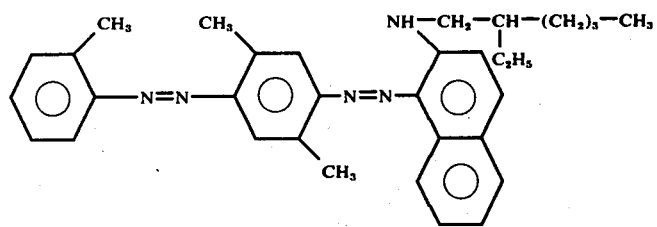

(LIQUID DYE)

EXAMPLE 5

The procedure of Example 1 is followed, except that a mixture of amines comprising 24% aniline, 13% mixed xylidines and 63% o-toluidine is subjected to partial diazotization and self-coupling producing mixed aminoazo compounds. The resultant mixture is diazotized according to the procedure of Example 1 and is coupled to 2-(2-ethylhexylamino)naphthalene and the resultant liquid dye is isolated according to Procedure B of Example 1 to provide a dye having, on the average, 1.78 methyl group substituents on the phenyl rings.

EXAMPLE 6

The procedure of Example 1 is followed, except that a mixture of mixed xylidine isomers is partially diazotized and self-coupled. The resultant aminoazo compound is diazotized and coupled to 2-(2-ethylhexylamino)naphthalene and the resultant liquid dye is isolated according to Procedure B of Example 1 to provide a liquid dye having four methyl group substituents on the phenyl rings.

EXAMPLE 7–12 COUPLING COMPONENT 2-(2-ETHYLHEXYLOXYPROPYLAMINO) NAPHTHALENE

EXAMPLE 7

The procedure of Example 1 was followed except that the coupling component was 2-ethylhexyloxypropylamino)naphthalene and the resultant azo dye was a solid having the formula

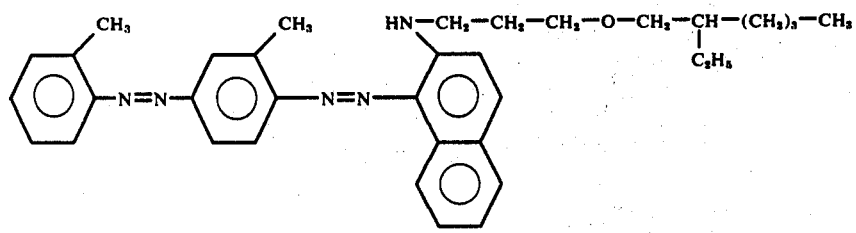

EXAMPLE 8

The procedure of Example 2 was followed except that the coupling component was 2-(2-ethylhexyloxypropylamino)naphthalene and the resultant azo dye was a liquid having the formula

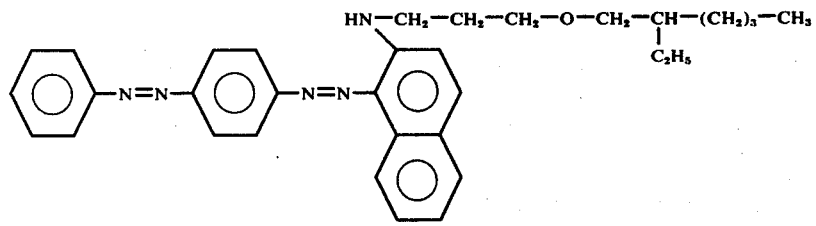

EXAMPLE 9

The procedure of Example 3 was followed except that the coupling component was 2-(2-ethylhexyloxypropylamino)naphthalene and the resultant azo dye was a tar having the formula

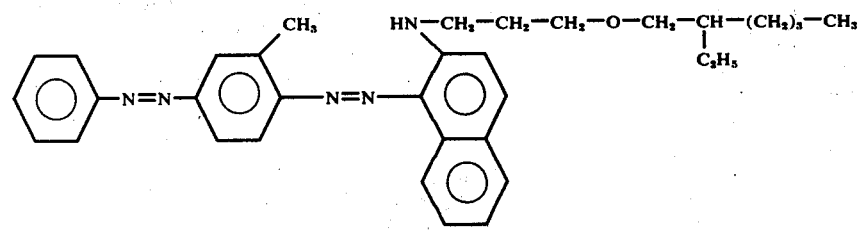

EXAMPLE 10

The procedure of Example 4 was followed except that the coupling component was 2-(2-ethylhexyloxypropylamino)naphthalene and the resultant azo dye was a tar having the formula

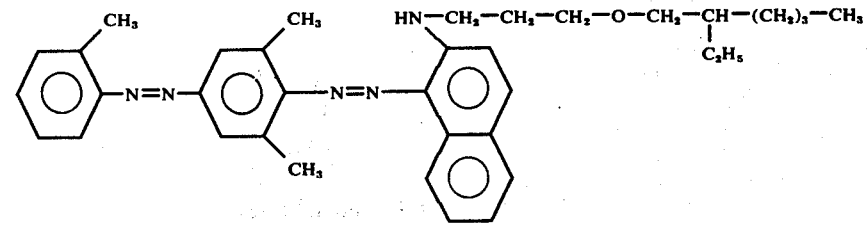

EXAMPLE 11

The procedure of Example 5 was followed except that the coupling component was 2-(2-ethylhexyloxypropylamino)naphthalene and the resultant dye was also a liquid as was the dye of Example 5.

EXAMPLE 12

The procedure of Example 6 was followed except that the coupling component was 2-(2-ethylhexyloxypropylamino)naphthalene and the resultant dye was a tar.

EXAMPLE 13

Equal quantities of each of the dyes of Examples 1–12 isolated and purified as non-volatile active colorants, were dissolved in equal quantities of No. 2 Heating Oil to provide six different dye solutions. The relative color strengths and shades of these solutions were determined and compared. The results are set forth in Table 1.

TABLE 1

COUPLING COMPONENT 2-ETHYLHEXYLAMINO NAPHTHALENE

| Example | Physical State of Dye at 20° C. | No. of $CH_3$ Groups on Phenyl Rings | % Relative Strength | Relative Shade |
|---|---|---|---|---|
| 1 | Liquid | 2 | 100 | Blue Red |
| 2 | Solid | 0 | 121 | Blue Red |
| 3 | Liquid | 1 | 112 | Blue Red |
| 4 | Liquid | 3 | 92 | Duller Blue Red than Examples 1, 2 or 3 |
| 5 | Liquid | 1.78 (Average) | 100 | Blue Red |
| 6 | Liquid | 4 | 90 | Duller Blue Red than Examples 1, 2 or 3 |
| 7 | Solid | 2 | 100 | Blue Red |
| 8 | Liquid | 0 | 103 | Yellower Red |
| 9 | Tar | 1 | 97 | Blue Red |
| 10 | Tar | 3 | 90 | Bluer Red |
| 11 | Liquid | 1.78 (Average) | 96 | Blue Red |
| 12 | Tar | 4 | 90 | Yellower Red |

The foregoing results show the following with respect to the azo dyes of the present invention, as represented by the general formula:

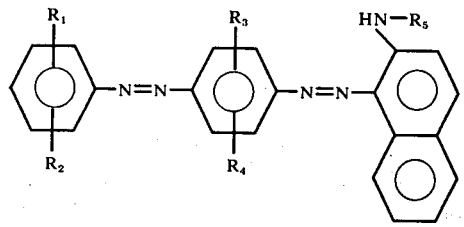

1. When $R_5$ is 2-ethylhexyl, then non-solid dyes are obtained when at least one of said $R_1$, $R_2$, $R_3$ and $R_4$ substituents is $CH_3$.
2. When $R_5$ is 2-ethylhexyloxypropyl, then non-solid dyes are obtained when:
   A. $R_1$, $R_2$, $R_3$ and $R_4$ are each H;
   B. $R_1$, $R_2$, $R_3$ and $R_4$ are each $CH_3$ provided that $R_1$ and $R_3$ and not both $CH_3$ at the same time when $R_2$ and $R_4$ are both H;
   C. $R_1$, $R_2$, $R_3$ and $R_4$ are each $CH_3$ provided that $R_2$ and $R_4$ are not both $CH_3$ at the same time when $R_1$ and $R_3$ are both H.

EXAMPLE 14

Each of the isolated and purified dyes of Examples 1–12 was dissolved in the following fuels in the proportion of 58% by weight of dye and 42% by weight of fuel:
No. 1 Heating Oil
No. 2 Heating Oil
No. 4 Heating Oil
No. 1 Premium Diesel Oil
No. 2 Premium Diesel Oil
No. 2 Regular Grade Diesel Oil Each dye-fuel oil mixture was warmed with stirring and then cooled to 25° C. The solid dyes of Examples 2 and 7 precipitated as a solid mass almost immediately upon cooling to 25° C. whereas the dyes of Examples 1, 3, 5 and 8 were completely soluble and remained soluble at temperatures ranging from −10° C. to 25° C. The dyes of Examples 4, 6, 9, 10, 11 and 12 all displayed some separation of dye upon lengthy storage, although equilibrium solubilities of each dye exceeded 25 percent by weight.

EXAMPLE 15

Solvent Red No. 19 was subjected to the same solubility test as set forth in Example 14. In each case where the dye-fuel oil mixture was warmed and then cooled to 25° C. precipitation occurred immediately.

In each instance, the precipitated mass was filtered and the dye content of the filtrate was determined colorimetrically. The results were as follows:

| Fuel | Red No. 19 % by Weight Soluble (At Equilibrium) |
|---|---|
| No. 1 Heating Oil | 2.23 |
| No. 2 Heating Oil | 3.41 |
| No. 4 Heating Oil | 5.76 |
| No. 1 Premium Diesel | 1.89 |
| No. 2 Premium Diesel | 2.30 |
| No. 2 Regular Diesel | 2.63 |

EXAMPLES 16–28

Aminoazobenzene was diazotized according to the procedure of Example 1 and then coupled to each of a series of aminonaphthalene compounds having the formula

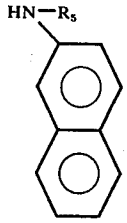

to give a dye of the general formula

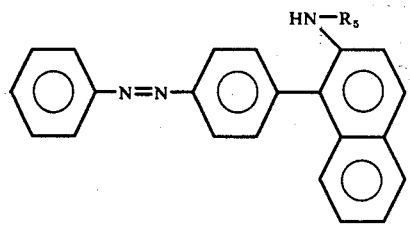

in which $R_5$ is as indicated and the physical state of the resulting dye after isolation according to Procedure B of Example 1 is as set forth in Table 2.

TABLE 2

| Example | $R_5$ | Physical State of Dye |
|---|---|---|
| 16 | Ethyl | Solid |
| 17 | n-Butyl | Solid |
| 18 | Methoxypropyl | Solid |
| 19 | Hydroxyethylethoxy | Solid |
| 20 | n-Hexyl | Solid |
| 21 | Cyclohexyl | Solid |
| 22 | Ethoxyethoxypropyl | Solid |
| 23 | n-Heptyl | Solid |
| 24 | n-Octyl | Solid |
| 25 | 2-Ethylhexyl | Solid |
| 26 | n-Decyl | Solid |
| 27 | 2-Ethylhexyloxypropyl | Liquid |
| 28 | n-Dodecyl | Solid |

As in evident, it was found that all of the foregoing dyes were solid materials with the exception of the dye of Example 27 which is a liquid. Thus, in Examples 16–28, where there are no $CH_3$ groups on the phenyl rings, the only liquid dye of this series is where $R_5$ is 2-ethylhexyloxypropyl.

EXAMPLES 29–41

Aminoazotoluene was diazotized according to the procedure of Example 1 and the coupled to each of a series of aminonaphthalenes having a formula

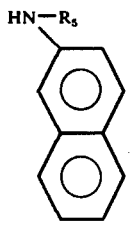

to give a dye of the general formula

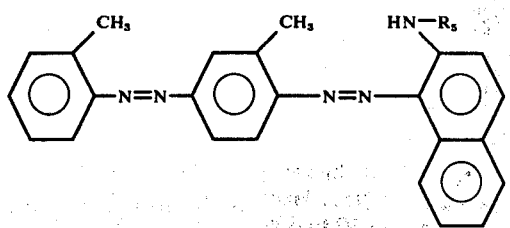

in which $R_5$ is as indicated and the physical state of the resulting dye after isolation according to Procedure B of Example 1 is as set forth in Table 3.

TABLE 3

| Example | $R_5$ | Physical State of Dye |
|---|---|---|
| 29 | Ethyl | Solid |
| 30 | n-Butyl | Solid |
| 31 | Methoxypropyl | Solid |
| 32 | Hydroxyethylethoxy | Solid |
| 33 | n-Hexyl | Solid |
| 34 | Cyclohexyl | Solid |
| 35 | Ethoxyethoxypropyl | Solid |
| 36 | n-Heptyl | Solid |
| 37 | n-Octyl | Solid |
| 38 | 2-Ethylhexyl | Liquid |
| 39 | n-Decyl | Solid |
| 40 | Ethylhexyloxypropyl | Solid |
| 41 | n-Dodecyl | Solid |

It is seen that in the instance where there is a $CH_3$ group on each of the phenyl rings, then only the dye of Example 38 is a liquid dye. This was surprising and unexpected in view of the fact that adjacent homologs, the n-heptyl and n-octyl derivatives, are solid dyes.

EXAMPLES 42–93

The solubility properties of each of the dyes of Examples 16–41 were evaluated in the fuels No. 1 and No. 2 Heating Oils, respectively. The procedure was as follows:

Where the dyes are solid dyes, excess of pulverized solid dye, far beyond that which would dissolve, i.e., 30 to 35% dye, was added to the respective oils at 25° C. and agitated at constant speed. Samples were removed at 1, 10 and 20 minute intervals, filtered, and the amount of dissolved dye determined colorimetrically.

The tarry non-solid dyes were charged in proportions of 50–60% dye to 50–40% oil rather than 30–35% used for the solid dyes. In fact, it was very difficult to stir the tarry dye-fuel oil mixture at a dye concentration of 50%. Samples for these dyes were taken after 2 minutes. The longer initial time for the tarry dyes was to permit reasonable contact between solvent and the viscous, condensed dye. The liquid dye resulting from coupling diazotized aminoazobenzene to 2-(2-ethylhexyloxypropyl)aminonaphthalene, i.e., the dye of Example 27, and the liquid dye resulting from coupling diazotized aminoazotoluene to 2-(2-ethylhexylamino)-naphthalene, i.e., the dye of Example 38, dissolved completely after two minutes contact was the heating oils.

The dye resulting from the reaction of diazotized aminoazobenzene and 2-(ethoxyethoxypropylamino)-naphthalene (the dye of Example 22) is a tar which is essentially mobile at room temperature but displays low solubility in both fuels much like that of a solid dye, and is therefore classified as such. The quantitative solubilities observed are set forth in Tables 4, 5, 6 and 7.

TABLE 4

| | | No. 1 Fuel Oil - Aminoazobenzene Dyes Percent Dissolved | | |
|---|---|---|---|---|
| Example | $R_5$ | 1 Minute | 10 Minutes | 20 Minutes |
| 42 | Ethyl | 1.05 | 1.36 | 1.48 |
| 43 | n-Butyl | 1.99 | 1.79 | 1.57 |
| 44 | Methoxypropyl | 2.02 | 3.15 | 3.57 |
| 45 | Hydroxyethylethoxy | 0.06 | 0.06 | 0.06 |
| 46 | n-Hexyl | 4.65 | 4.47 | 4.35 |
| 47 | Cyclohexyl | 4.01 | 2.25 | 2.30 |
| 48 | Ethoxyethoxypropyl | 3.68 | — | 3.68 |
| 49 | n-Heptyl | 4.92 | 7.83 | 7.56 |
| 50 | n-Octyl | 12.05 | 7.26 | 5.96 |
| 51 | 2-Ethylhexyl | 3.43 | 3.87 | 4.47 |
| 52 | n-Decyl | 4.97 | 5.12 | 5.63 |
| 53 | Ethylhexyloxypropyl | 52.3 (2min.) | — | 52.3 |
| 54 | n-Dodecyl | 2.85 | 4.60 | 5.38 |

TABLE 5

| | | No. 2 Fuel Oil - Aminoazobenzene Dyes Percent Dissolved | | |
|---|---|---|---|---|
| Example | $R_5$ | 1 Minute | 10 Minutes | 20 Minutes |
| 55 | Ethyl | 1.49 | 1.64 | 1.78 |
| 56 | n-Butyl | 1.83 | 2.03 | 2.12 |
| 57 | Methoxypropyl | 0.66 | 0.68 | 0.73 |
| 58 | Hydroxyethylethoxy | 0.14 | 0.17 | 0.21 |
| 59 | n-Hexyl | 5.12 | 5.12 | 5.27 |
| 60 | Cyclohexyl | 3.10 | 3.10 | 3.21 |
| 61 | Ethoxyethoxypropyl | 0.57 | 0.58 | 0.61 |
| 62 | n-Heptyl | 7.11 | 8.10 | 8.90 |
| 63 | n-Octyl | 5.48 | 6.25 | 6.25 |
| 64 | 2-Ethylhexyl | 4.63 | 4.90 | 5.13 |
| 65 | n-Decyl | 6.36 | 7.25 | 8.14 |
| 66 | Ethylhexyloxypropyl | 52.3 (2 min.) | — | 52.3 |
| 67 | n-Dodecyl | 7.46 | 8.17 | 9.06 |

The foregoing results set forth in Tables 4 and 5 demonstrate that the solid dyes have relatively limited solubility in fuel oils, whereas the single liquid dye (where $R_5$ is ethylhexyloxypropyl – see Examples 53 and 66) displays exceptionally high solubility.

TABLE 6

| | | No. 1 Fuel Oil - Aminoazotoluene Dyes Percent Dissolved | | |
|---|---|---|---|---|
| Example | $R_5$ | 1 Minute | 10 Minutes | 20 Minutes |
| 68 | Ethyl | 0.24 | 0.32 | 0.37 |
| 69 | n-Butyl | 0.19 | 0.26 | 0.26 |
| 70 | Methoxypropyl | 0.58 | 0.57 | 0.58 |
| 71 | Hydroxyethylethoxy | 0.09 | 0.12 | 0.13 |
| 72 | n-Hexyl | 1.31 | 1.28 | 1.27 |
| 73 | Ethoxyethoxypropyl | 5.33 | 6.23 | 7.40 |
| 74 | Cyclohexyl | 0.82 | 0.87 | 0.94 |
| 75 | n-Heptyl | 1.42 | 1.56 | 1.65 |
| 76 | n-Octyl | 1.38 | 1.39 | 1.78 |
| 77 | 2-Ethylhexyl | 58.0 (2 min) | — | 58.0 |
| 78 | n-Decyl | 1.09 | 1.13 | 1.14 |
| 79 | Ethylhexyloxypropyl | 6.44 | 7.41 | 8.35 |
| 80 | n-Dodecyl | 3.29 | 4.04 | 4.50 |

| | | No. 2 Fuel Oil - Aminoazotoluene Dyes Percent Dissolved | | |
|---|---|---|---|---|
| Example | $R_5$ | 1 Minute | 10 Minutes | 20 Minutes |
| 81 | Ethyl | 0.29 | 0.37 | 0.39 |
| 82 | n-Butyl | 0.27 | 0.29 | 0.35 |
| 83 | Methoxypropyl | 2.96 | 4.21 | 4.96 |
| 84 | Hydroxyethylethoxy | 0.20 | 0.15 | 0.15 |
| 85 | n-Hexyl | 0.93 | 1.01 | 1.11 |
| 86 | Ethoxyethoxypropyl | 3.70 | — | 3.97 |
| 87 | Cyclohexyl | 0.99 | 1.05 | 1.09 |
| 88 | n-Heptyl | 1.77 | 2.27 | 2.59 |
| 89 | n-Octyl | 2.26 | 2.89 | 2.69 |
| 90 | 2-Ethylhexyl | 55.3 (2 min) | — | 55.3 |
| 91 | n-Decyl | 1.30 | 1.37 | 1.48 |
| 92 | Ethylhexyloxypropyl | 6.12 | 6.85 | 7.71 |
| 93 | n-Dodecyl | 4.48 | 4.68 | 5.21 |

The foregoing results set forth in Tables 6 and 7 demonstrate that the solid dyes have relatively limited solubility in fuel oils whereas the single liquid dye (where $R_5$ is 2-ethylhexyl – see Examples 77 and 90) displays exceptionally high solubility.

EXAMPLE 94

The isolated and purified dyes of Examples 1–6, where $R_5$ is 2-ethylhexyl, were dissolved by warming with agitation in No. 1 Heating Oil in the proportions of 50 to 60% dye in 50 to 40% of the petroleum fuel. The resultant mixtures were stored at ambient temperatures (20° to 25° C.) and at −10° C. Where any separation of dye occurred, the dye content of the remaining solution was determined colorimetrically. The results are shown in Table 8.

petroleum fuel was No. 1 Heating Oil. The results are set forth in Table 10.

TABLE 10

| Dye of Example | $R_s$ | NO. 1 HEATING OIL Number $CH_3$ Groups | Solubility (% by Wt.) (20° C.–25° C.) | −10° C. |
|---|---|---|---|---|
| 7 | 2-ethylhexyloxy-propyl | 2 ($R_1$ and $R_3$ are both $CH_3$) | 8.3 | — |
| 8 | 2-ethylhexyloxy-propyl | 0 | Complete | Complete |
| 9 | 2-ethylhexyloxy-propyl | 1 | 26.6 | 9.5 |
| 10 | 2-ethylhexyloxy-propyl | 3 | 29.5 | 19.8 |
| 11 | 2-ethylhexyloxy-propyl | 1.78(average) | 41 | 24.7 |
| 12 | 2-ethylhexyloxy-propyl | 4 | 31 | 17.0 |

TABLE 8

| Dye of | NO. 1 HEATING OIL Number | Solubility (% by Wt.) |
|---|---|---|

EXAMPLE 97

The procedure of Example 94 was repeated except that the dyes were those of Examples 7–12 and the petroleum fuel was No. 2 Heating Oil. The results are set forth in Table 11.

TABLE 11

| Dye of Example | $R_s$ | NO. 2 HEATING OIL Number $CH_3$ Groups | Solubility (% by Wt.) (20° C.–25° C.) | −10° C. |
|---|---|---|---|---|
| 7 | 2-ethylhexyloxy-propyl | 2 ($R_1$ and $R_3$ are both $CH_3$) | 7.7 | — |
| 8 | 2-ethylhexyloxy-propyl | 0 | Complete | Complete |
| 9 | 2-ethylhexyloxy-propyl | 1 | 28.8 | 9.5 |
| 10 | 2-ethylhexyloxy-propyl | 3 | 29.7 | 12.1 |
| 11 | 2-ethylhexyloxy-propyl | 1.78(average) | 40 | 24.2 |
| 12 | 2-ethylhexyloxy-propyl | 4 | 28.3 | 19.7 |

| Example | $R_s$ | $CH_3$ Groups | (20° C.–25° C.) | −10° C. |
|---|---|---|---|---|
| 1 | 2-ethylhexyl | 2 | Complete | Complete |
| 2 | 2-ethylhexyl | 0 | 4.4 | — |
| 3 | 2-ethylhexyl | 1 | Complete | Complete |
| 4 | 2-ethylhexyl | 3 | 44.8 | — |
| 5 | 2-ethylhexyl | 1.78(average) | Complete | Complete |
| 6 | 2-ethylhexyl | 4 | 46.6 | — |

EXAMPLE 95

The procedure of Example 94 was repeated except that the petroleum fuel was No. 2 Heating Oil. The results are set forth in Table 9.

TABLE 9

| Dye of Example | $R_s$ | NO. 2 HEATING OIL Number $CH_3$ Groups | Solubility (% by Wt.) (20° C.–25° C.) | −10° C. |
|---|---|---|---|---|
| 1 | 2-ethylhexyl | 2 | Complete | Complete |
| 2 | 2-ethylhexyl | 0 | 5.1 | — |
| 3 | 2-ethylhexyl | 1 | Complete | Complete |
| 4 | 2-ethylhexyl | 3 | 44.1 | — |
| 5 | 2-ethylhexyl | 1.78(average) | Complete | Complete |
| 6 | 2-ethylhexyl | 4 | 45.7 | — |

EXAMPLE 96

The procedure of Example 94 was repeated except that the dyes of Examples 7–12 were used and the The following conclusions may be drawn from the results of Examples 1–97:

1. Where the $R_5$ substituent is 2-ethylhexyl and there is at least one methyl substituent on the phenyl rings, i.e., where at least one of $R_1$, $R_2$, $R_3$ and $R_4$ is $CH_3$, then:

A. Non-solid dyes in the form of liquids or tars are obtained.

B. Such dyes have a high solubility in petroleum fuels.

2. Where the $R_5$ substituent is 2-ethylhexyloxypropyl, then:

Non-solid dyes, in the form of liquids or tars, which are highly soluble in petroleum fuels are obtained when either (A) each of $R_1$, $R_2$, $R_3$ and $R_4$ is hydrogen, or (B) each of $R_1$, $R_2$, $R_3$ or $R_4$ is $CH_3$, provided that $R_1$ and $R_3$ are not both $CH_3$ at the same time when $R_2$ and $R_4$ are both H, or (C) each of $R_1$, $R_2$, $R_3$ and $R_4$ is $CH_3$, provided that $R_2$ and $R_4$ are not both $CH_3$ at the same time when $R_1$ and $R_3$ are both H.

3. The solubility in various petroleum fuels and of the azo dyes of the present invention is remarkably and surprisingly high when compared with the solid dyes of similar chemical structure.

EXAMPLE 98

To demonstrate that the azo dyes of this invention have a much lesser solubility in petroleum fuels than in xylene, a conventionally used aromatic solvent, each of the dyes of Examples 1–12 was dissolved by warming with agitation in xylene in the proportions of 50–60% dye and 50 to 40% xylene. The solutions obtained were stored at 20°–25° C. and at –10° C. Where any separation of dye occurred, the dye content of the remaining solution was determined colorimetrically. The results are shown in Table 12.

TABLE 12

| Dye of Example | $R_5$ | XYLENE Solubility (% by Wt.) | |
|---|---|---|---|
| | | (20° C.–25° C.) | –10° C. |
| 1 | 2-ethylhexyl | Complete | Complete |
| 2 | 2-ethylhexyl | 25.5 | 10.35 |
| 3 | 2-ethylhexyl | Complete | Complete |
| 4 | 2-ethylhexyl | 50.0 | 25.0 |
| 5 | 2-ethylhexyl | Complete | Complete |
| 6 | 2-ethylhexyl | 43.5 | 37.5 |
| 7 | 2-ethylhexyloxypropyl | Complete | 20.8 |
| 8 | 2-ethylhexyloxypropyl | Complete | Complete |
| 9 | 2-ethylhexyloxypropyl | Complete | 38.1 |
| 10 | 2-ethylhexyloxypropyl | 36.3 | 20.8 |
| 11 | 2-ethylhexyloxypropyl | Complete | 43.5 |
| 12 | 2-ethylhexyloxypropyl | 42.8 | 35.7 |

The present invention, therefore, provides azo dyes which have a high solubility in petroleum fuels and overcome the noted deficiencies of prior art solid azo dyes.

What is claimed is:

1. An azo dye having a high solubility in petroleum fuels and having the formula

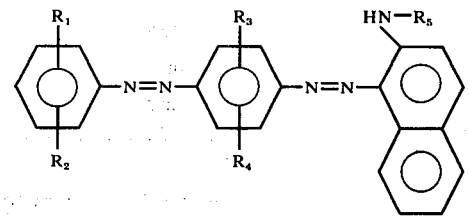

in which $R_1$, $R_2$, $R_3$ and $R_4$ are each H or $CH_3$ and $R_5$ is either 2-ethylhexyl or 2-ethylhexyloxypropyl, wherein:
 A. when $R_5$ is 2-ethylhexyl, then at least one of said $R_1$, $R_2$, $R_3$ and $R_4$ is $CH_3$;
 B. when $R_5$ is 2-ethylhexyloxypropyl, then each of said $R_1$, $R_2$, $R_3$ and $R_4$ is either, H or $CH_3$ provided that $R_1$ and $R_3$ are not both $CH_3$ at the same time when $R_2$ and $R_4$ are both H, or $R_2$ and $R_4$ are not both $CH_3$ at the same time when $R_1$ and $R_3$ are both H.

2. An azo dye of claim 1 wherein $R_1$ or $R_2$ is $CH_3$ and $R_5$ is 2-ethylhexyl.

3. An azo dye of claim 1 wherein $R_3$ or $R_4$ is $CH_3$ and $R_5$ is 2-ethylhexyl.

4. An azo dye of claim 1 wherein $R_1$ and $R_2$ are each $CH_3$ and $R_5$ is 2-ethylhexyl.

5. An azo dye of claim 1 wherein $R_3$ and $R_4$ are each $CH_3$ and $R_5$ is 2-ethylhexyl.

6. An azo dye of claim 1 wherein $R_1$ and $R_3$ are each $CH_3$ and $R_5$ is 2-ethylhexyl.

7. An azo dye of claim 1 wherein $R_2$ and $R_4$ are each $CH_3$ and $R_5$ is 2-ethylhexyl.

8. An azo dye of claim 1 wherein $R_1$, $R_3$ and $R_4$ are each $CH_3$ and $R_5$ is 2-ethylhexyl.

9. An azo dye of claim 1 wherein $R_1$, $R_2$, $R_3$ and $R_4$ are each $CH_3$ and $R_5$ is 2-ethylhexyl.

10. An azo dye having a high solubility in petroleum fuels and having the formula

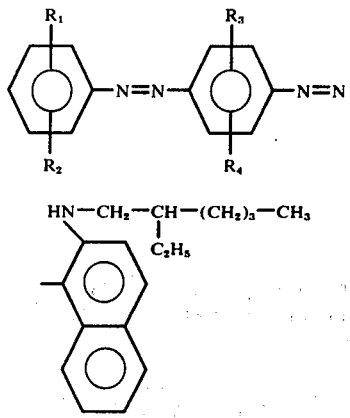

in which $R_1$, $R_2$, $R_3$ and $R_4$ are each H or $C_3$ with the proviso that at least one of said $R_1$, $R_2$, $R_3$ and $R_4$ is $CH_3$.

11. The azo dye of claim 10 wherein $R_1$ is $CH_3$.
12. The azo dye of claim 10 wherein $R_2$ is $CH_3$.
13. The azo dye of claim 10 wherein $R_3$ is $CH_3$.
14. The azo dye of claim 10 wherein $R_4$ is $CH_3$.

15. An azo dye having a high solubility in petroleum fuels and having the formula

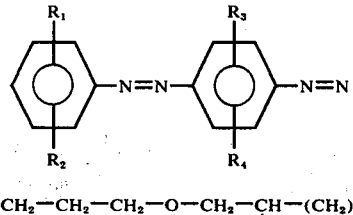

in which each of $R_1$, $R_2$, $R_3$ and $R_4$ is H or $CH_3$, with the proviso that $R_1$ and $R_3$ are not both $CH_3$ at the same time when $R_2$ and $R_4$ are both H, and $R_2$ and $R_4$ are not both $CH_3$ at the same time when $R_1$ and $R_3$ are both H.

16. The azo dye of claim 15 wherein each of said $R_1$, $R_2$, $R_3$ and $R_4$ is H.

17. The azo dye of claim 15 wherein each of said $R_1$, $R_2$, $R_3$ and $R_4$ is $CH_3$.

18. A colored petroleum fuel having dissolved therein an azo dye composition having the general formula

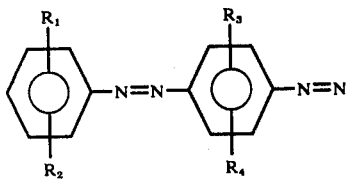

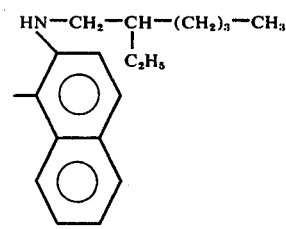

in which $R_1$, $R_2$, $R_3$ and $R_4$ are each H or $CH_3$ with the proviso that at least one of said $R_1$, $R_2$, $R_3$ and $R_4$ is $CH_3$.

19. A colored petroleum fuel having dissolved therein an azo dye composition having the formula

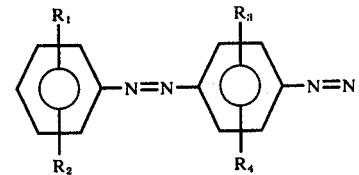

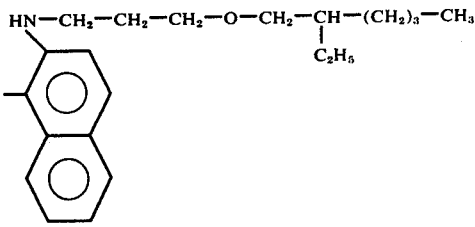

in which each of $R_1$, $R_2$, $R_3$ and $R_4$ is H or $CH_3$, with the proviso that $R_1$ and $R_3$ are not both $CH_3$ at the same time when $R_2$ and $R_4$ are both H, and $R_2$ and $R_4$ are not both $CH_3$ at the same time when $R_1$ and $R_3$ are both H.

20. The colored petroleum fuel of claim 19 wherein each of said $R_1$, $R_2$, $R_3$ and $R_4$ is H.

21. The colored petroleum distillate of claim 19 wherein each of said $R_1$, $R_2$, $R_3$ and $R_4$ is $CH_3$.

* * * * *

UNITED STATES PATENT AND TRADEMARK OFFICE
CERTIFICATE OF CORRECTION

PATENT NO. : 4,000,985
DATED : Jan. 4, 1977
INVENTOR(S) : Richard B. Orelup

It is certified that error appears in the above-identified patent and that said Letters Patent are hereby corrected as shown below:

Column 2 Line 40 — Structure of SOLVENT RED NO. 19 should be:

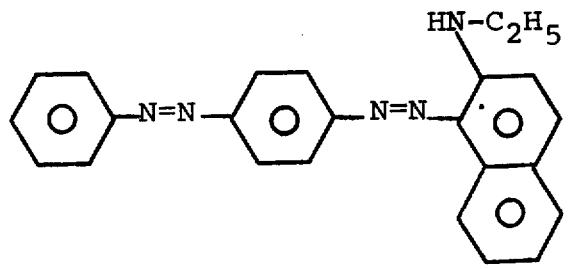

NOT

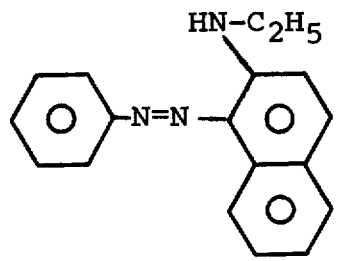

as depicted--

Column 11 - Table I

Omitted caption "2-(2-ETHYLHEXYLOXYPROPYLAMINO) NAPHTHALENE" should precede Examples 7-12 in TABLE I.

Column 11 Line 43

"and" second occurrence, should read -- are --.

Signed and Sealed this

Third Day of May 1977

[SEAL]

Attest:

RUTH C. MASON
Attesting Officer

C. MARSHALL DANN
Commissioner of Patents and Trademarks

Notice of Adverse Decision in Interference

In Interference No. 100,018, involving Patent No. 4,000,985, R.B. Orelup, AZO DYES HAVING A HIGH SOLUBILITY IN PETROLEUM FUELS, final judgment adverse to the patentee was rendered Feb. 2, 1981, as to claims 16 and 20.

[*Official Gazette June 8, 1982.*]